E. C. DITTMAR.
APPARATUS FOR COATING AND FINISHING FLOORING.
APPLICATION FILED AUG. 28, 1918.
1,339,107. Patented May 4, 1920.
6 SHEETS—SHEET 3.
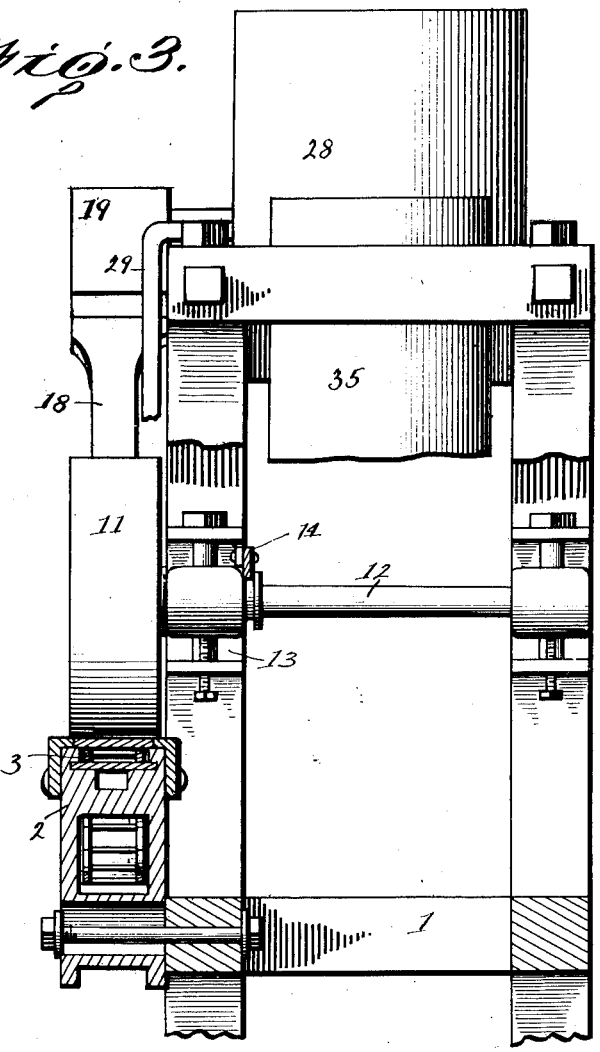
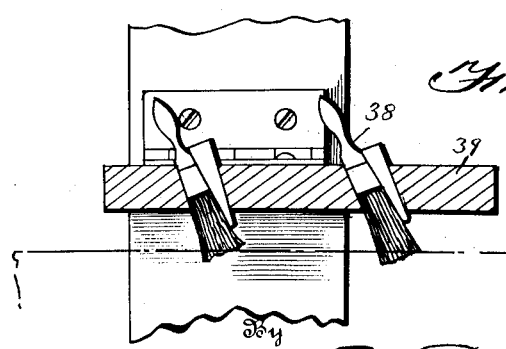
Inventor
E. C. Dittmar.
By
Attorney E. C. DITTMAR.
APPARATUS FOR COATING AND FINISHING FLOORING.
APPLICATION FILED AUG. 28, 1918.
1,339,107.
Patented May 4, 1920.
6 SHEETS—SHEET 4.
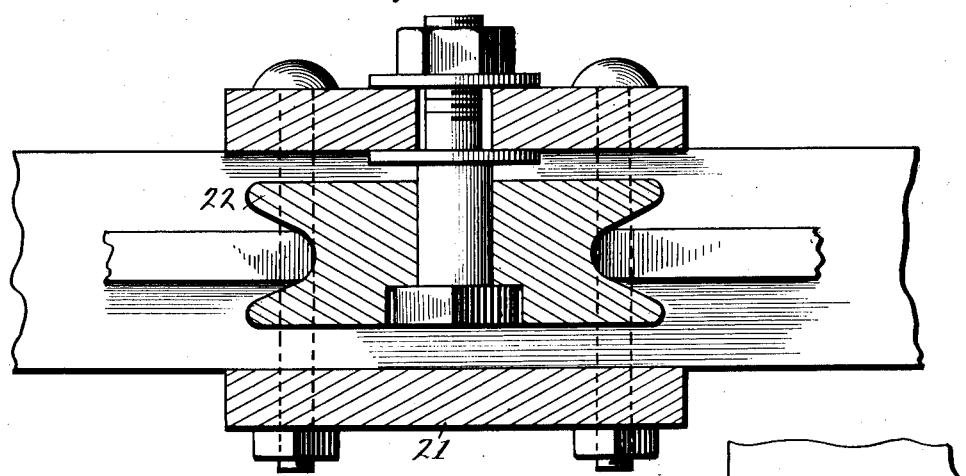
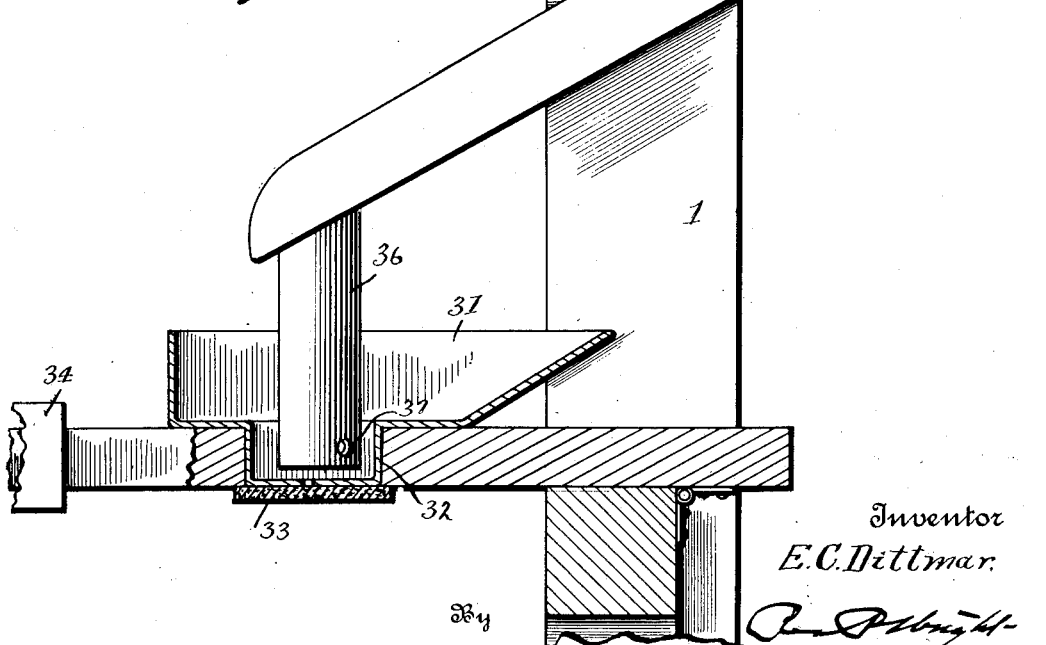
Inventor
E. C. Dittmar.

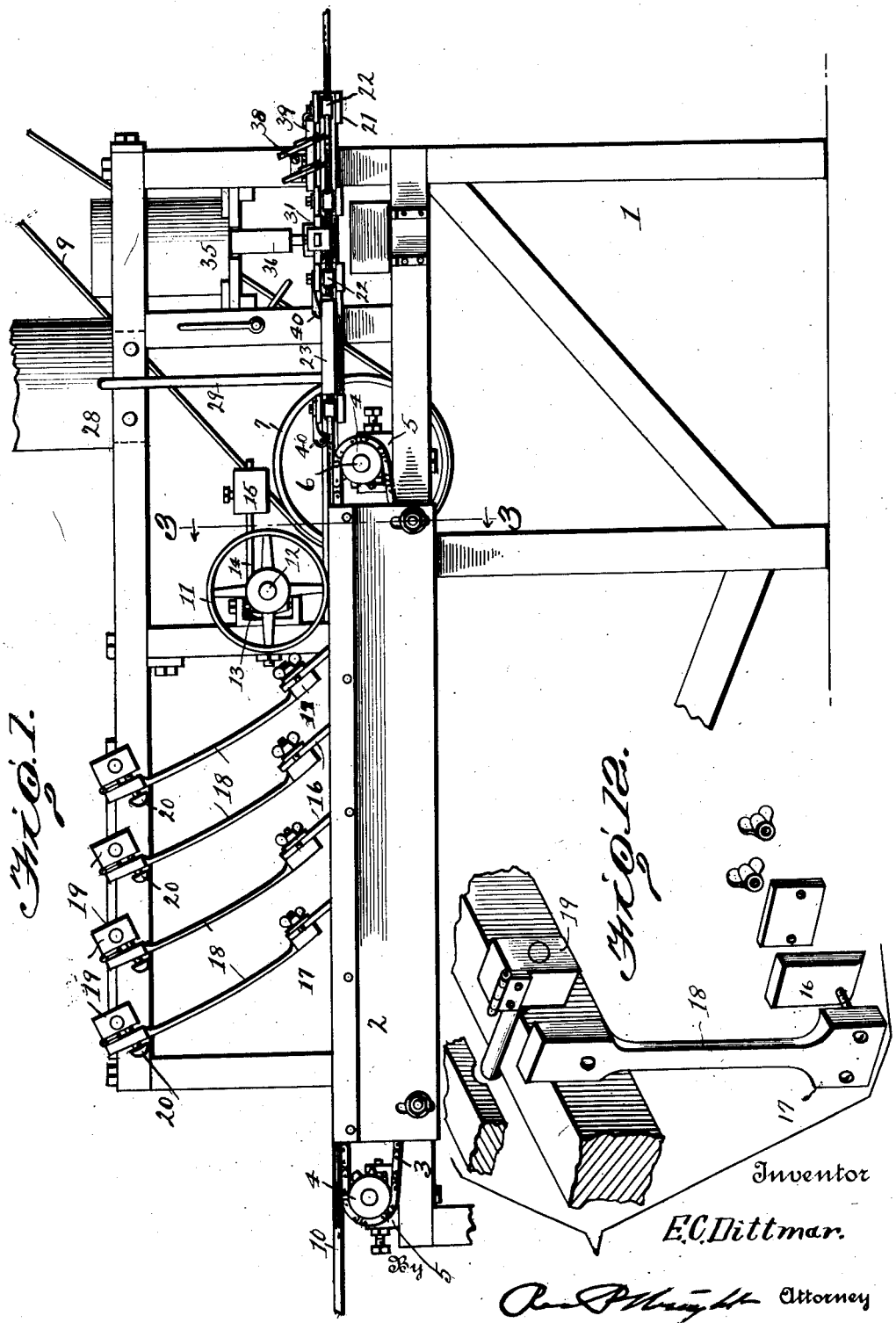

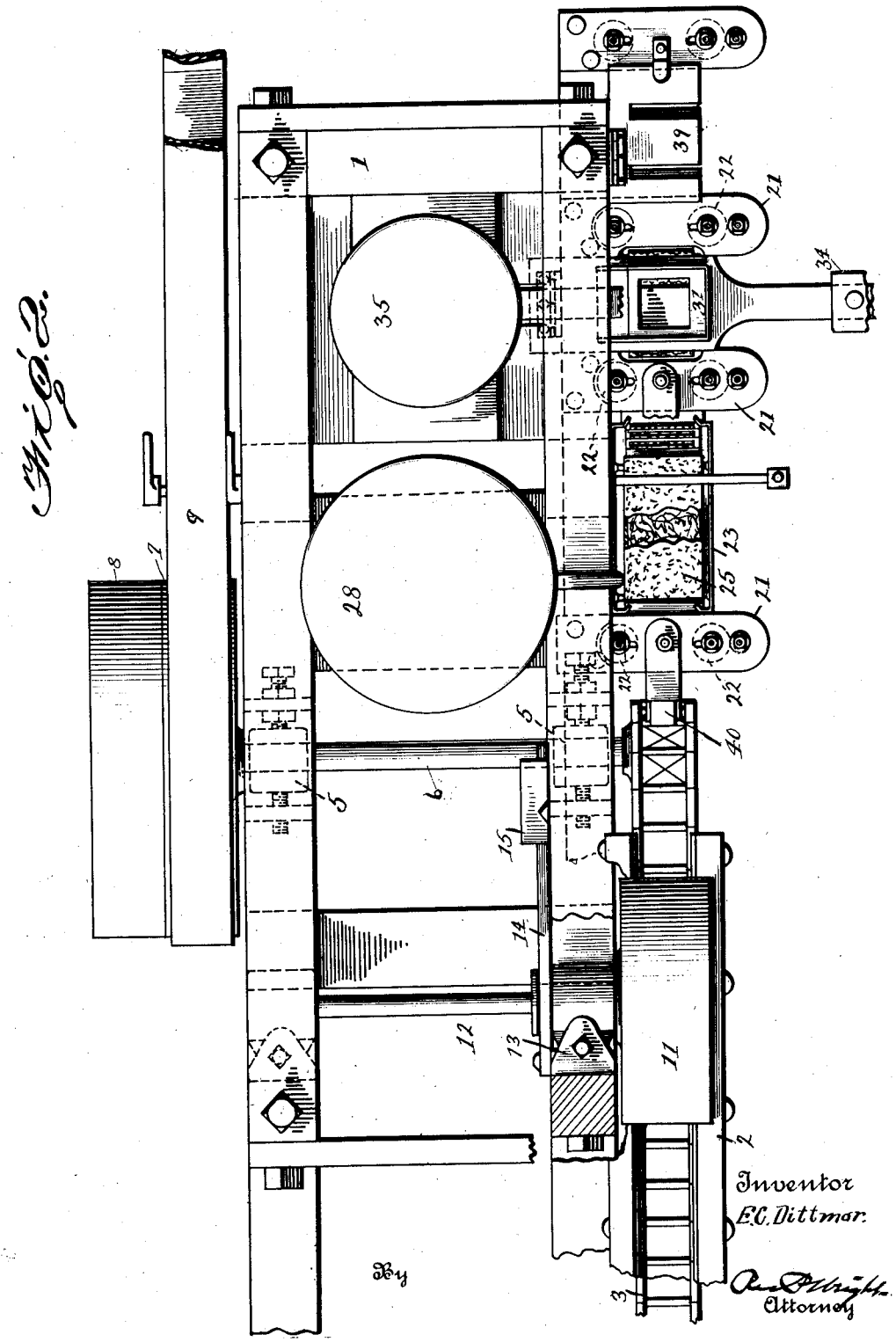

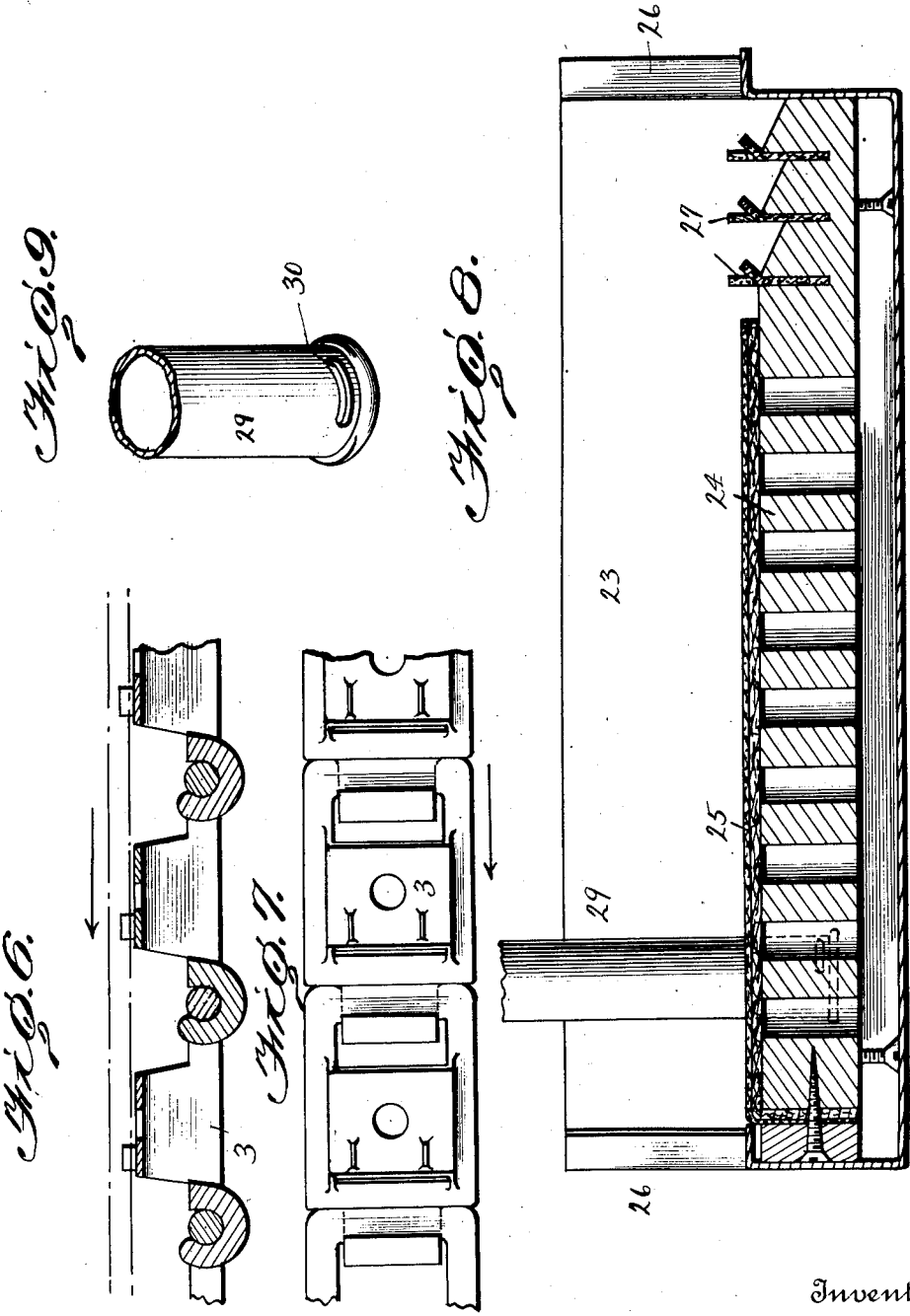

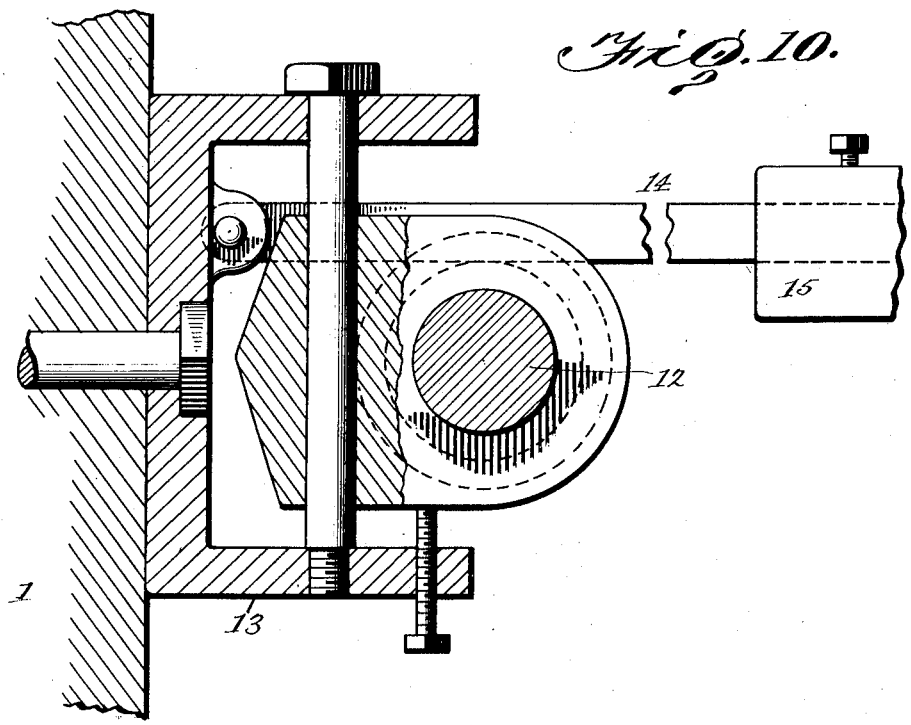
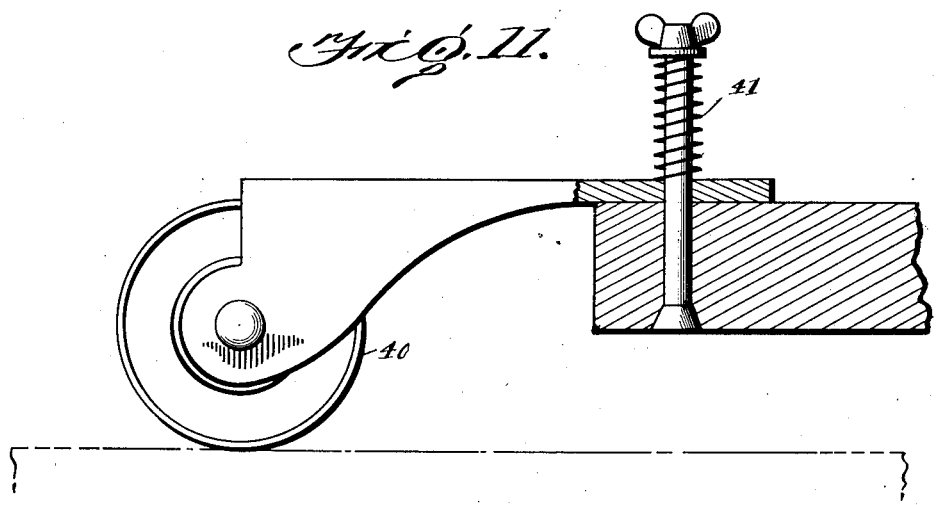

UNITED STATES PATENT OFFICE.

ELMER C. DITTMAR, OF WILLIAMSPORT, PENNSYLVANIA.

APPARATUS FOR COATING AND FINISHING FLOORING.

1,339,107.　　　　　Specification of Letters Patent.　　Patented May 4, 1920.

Application filed August 28, 1918. Serial No. 251,740.

*To all whom it may concern:*

Be it known that I, ELMER C. DITTMAR, a citizen of the United States, residing at Williamsport, in the county of Lycoming and State of Pennsylvania, have invented certain new and useful Improvements in Apparatus for Coating and Finishing Flooring, of which the following is a specification, reference being had therein to the accompanying drawing.

This invention relates to an apparatus for coating and finishing flooring and is a companion application of my application filed August 28, 1918, Serial No. 251,739, the object being to provide a machine by means of which the flooring filled and varnished in an apparatus constructed as shown in my companion application can be given a coating of oil, and an additional coating of varnish so as to complete the finishing of the flooring strip.

Another object of the invention is to provide novel means for applying a coating of oil to the under face of the flooring strip as it passes through the machine so that the entire surface of the strip will be coated in order to preserve the strip when in use.

Another and further object of the invention is to provide novel means for smoothing the surface thus treated so that the last coat of varnish can be applied without brush marks, whereby I am able to obtain a high finish without applying a smoothing powder thereto.

Other and further objects and advantages of the invention will be hereinafter set forth and the novel features thereof defined in the appended claims.

In the drawings,

Figure 1 is a side elevation of the apparatus for coating and finishing flooring.

Fig. 2 is a top plan view of the same.

Fig. 3 is an end view and a section taken on the line 3—3 of Fig. 1.

Fig. 4 is a detail vertical section through one of the guide rollers.

Fig. 5 is an elevation partly in section of the varnish tank and tray.

Fig. 6 is a vertical section through a portion of the endless conveyer.

Fig. 7 is a top plan view of the same.

Fig. 8 is a vertical section through the oil tray.

Fig. 9 is a detail perspective view of the lower end of the oil feed pipe.

Fig. 10 is a vertical section through the pressure roll bearing, partly in elevation.

Fig. 11 is an elevation, partly in section, of one of the pressure rolls.

Fig. 12 is a perspective view showing the manner of mounting the burnishers; and Fig. 13 is a section showing the manner of securing the brushes to the holder.

In the drawings, 1 indicates a frame which is provided with a horizontally disposed guide-way 2, in which is mounted one of the run-ways of an endless conveyer 3, carried by sprockets 4 mounted in adjustable bearings 5, as clearly shown in Fig. 1. One of the sprockets is mounted on a shaft 6, journaled in suitable bearings in the frame 1, and having a tight and loose pulley 7 and 8 mounted thereon which are adapted to be driven by a drive belt 9 from any suitable source of power, not shown.

The endless conveyer 3 is driven by the shaft 6 so as to move in the guide-way which is formed of such a width that it receives snugly a strip of flooring 10 to be operated on. The conveyer is provided with spurs which are adapted to engage the under side of the strip 10, the strip being forced against the conveyer by pressure roller 11, carried by a shaft 12 mounted in an adjustable bearing 13 which is engaged by an arm 14 carrying a weight 15 in order to apply the proper pressure to the strip.

Mounted above the conveyer in advance of the pressure roller 11 are a series of burnishers 16 preferably formed of glass mounted in blocks 17 carried by flexible holders 18 which are pivotally connected to supports 19 and are provided with screws 20 for adjusting the pressure. While in this apparatus I have shown this construction of holder for the burnishers, the construction shown in my companion application can be used, and I do not wish to limit myself to the use of any particular construction of burnisher as I have found in practice that other styles can be used in order to accomplish the same results.

Arranged in the same horizontal plane as the conveyer at the opposite end of the frame are supports 21 having adjustable guide rollers 22, between which the strip of material being operated on is adapted to pass, and these rollers are preferably grooved so as to support the strip in such a manner that the upper and lower surfaces of the strip can be readily coated, as will be later described.

Mounted on a suitable bracket extending from the frame 1 is an oil tray 23 in which is adjustably mounted the perforated block 24 having its upper surface covered with cloth 25 which is adapted to apply the coat of oil to the under surface of the strip as it passes over the same. The tray 23 is formed with open ends which are bent to form guide-ways 26 so as to guide the strip of flooring as it passes through the same.

In order to remove the surplus of oil I provide the block 24 with leather strips 27 which engage the under surface of the strip of flooring after it has been coated with oil so as to force the oil into the pores and to remove the same therefrom.

The oil tray 23 is supplied with oil from a tank 28 by a pipe 29, which is provided with a slot 30, said pipe extending down into the tray in such a manner that the oil will be maintained at a predetermined level therein and prevented from overflowing by atmospheric pressure.

Pivotally mounted on the frame 1 is a varnish tray 31 which is provided with a reduced lower portion 32 having an apertured bottom over which is arranged a strip of felt 33 which is adapted to be held in contact with the upper surface of the strip of flooring by pressure through the medium of a weight 34 so as to apply the last coat of varnish to the strip. The varnish tray 31 is supplied with varnish from the varnish tank 35 through a pipe 36 which extends into the reduced portion of the tray, and is provided with an opening 37 in order to maintain the varnish in the tank at a predetermined level. This prevents the varnish from hardening as only a small amount of varnish is maintained in the tray.

After the strip of flooring has been given a coat of varnish it passes under a pair of brushes 38, carried by a brush holder 39, pivoted to the frame 1 so as to apply the varnish evenly to the surface as the strip passes through the machine.

In order to hold the strip firmly against the cloth in the oil tank I arrange a pair of pressure rollers 40 to each side of the oil tray, said rollers being held under tension by coiled springs 41, as shown in Fig. 11.

As a strip of material which has been filled and varnished and allowed to dry is fed onto the endless conveyer 3 it first passes under the burnishers 16 where all rough portions are removed, and as it passes under the pressure roller 11 is forced into engagement with the endless conveyer in such a manner that it is carried forward through the oil tray 23 and under the varnish tray 31. As the strip is not driven by the endless conveyer when the end thereof leaves the conveyer the movement stops until it is engaged by the next strip, and this prevents the strips from being carried out from under the varnish tray until the next strip has passed under the same, thereby eliminating any waste.

In the drawings I have shown details of construction but I do not wish to limit myself to these various details of construction, as the main object of my invention is to provide an apparatus for carrying out the method of coating the under surface of a strip of flooring with a preservative and the upper surface with varnish in such a manner that all hand work is eliminated. The method herein disclosed forms the subject of my application Serial No. 263,359, filed Nov. 20, 1918.

What I claim is:

1. An apparatus of the kind described comprising a movable conveyer for supporting and moving a strip of flooring, burnishers disposed above said conveyer, means for holding said burnishers in contact with the strip under pressure, and means for applying a coating of varnish to the upper surface of said strip.

2. An apparatus of the kind described comprising a movable conveyer for supporting and moving a strip of flooring, burnishers disposed above said conveyer for smoothing the strip, adjustable means for holding said burnishers in contact with the strip under pressure, means for applying a coating of varnish to the upper surface of the strip and means for spreading the varnish applied.

3. An apparatus of the kind described comprising a movable support for supporting a strip of flooring, a series of yielding burnishers disposed above said support for smoothing the strip, means for applying a coating of varnish to the strip, and a series of burnishers disposed in the path of travel of said strip for spreading the varnish applied.

4. An apparatus of the kind described, comprising an endless conveyer for moving a strip of flooring, burnishers disposed above said conveyer for smoothing the strip, means disposed to apply varnish to the upper surface of the strip, and brushes for spreading the varnish.

5. An apparatus of the kind described, comprising a frame having a horizontally disposed guide-way, an endless conveyer working in said guide-way, a self feeding oil tray arranged in alinement with said conveyer, an oil pad adjustably mounted in said tray, and means for holding the strip of material passing through said machine in contact with said pad under pressure.

6. An apparatus of the kind described, having means for conveying a strip of flooring, means for burnishing the upper side of the strip, and means for coating the upper surface of the strip with varnish.

7. In an apparatus of the kind described, the combination with an endless conveyer for supporting and moving a strip of flooring, means for burnishing the strip when on said conveyer, and means for coating the upper surface of the strip with varnish.

8. An apparatus for coating and finishing flooring comprising a frame having a horizontally disposed endless conveyer provided with spurs for engaging the strip of flooring to be operated on, a pressure roller for holding said strip in engagement with said conveyer, guide rollers for guiding the strip after it leaves the conveyer, and means for coating the upper and lower surfaces of said strip in its passage through said apparatus.

9. In an apparatus of the kind described, the combination of an endless conveyer for feeding a strip, of means for burnishing a side of the strip when on said conveyer, means for guiding the strip after it leaves the conveyer, and means for coating the upper and lower surfaces of said strip.

10. In an apparatus of the kind described, the combination with a support of a conveyer working over said support, burnishers mounted above said conveyer, a pressure roller mounted above said conveyer, guide rollers arranged in line with said conveyer, and means disposed to coat the upper and lower surfaces of a strip as it passes through said guide rollers.

11. An apparatus of the kind described comprising a movable conveyer for moving and supporting a strip of flooring, a series of burnishers arranged in the path of travel of said strip of flooring, means for holding said burnishers in contact with said strip under pressure, a pivoted varnish tray arranged to apply varnish to the upper surface of said strip, means for holding said varnish tray in contact with said strip under pressure and means for spreading the varnish applied.

12. An apparatus of the kind described comprising a movable support for supporting and moving the strip of flooring, an oil tray arranged in alinement with said support, an oil pad mounted in said tray for applying oil to the under surface of said strip, and means disposed in alinement with said strip for forcing the oil into the pores of the wood and for removing the surplus therefrom.

13. An apparatus of the kind described comprising a movably mounted support for supporting and guiding a strip of flooring, an oil tray arranged in alinement with said support, an oil pad mounted in said tray, a series of wipers arranged in said tray and means for holding the strip of material in contact with said oil pad and wipers in its passage therethrough.

14. An apparatus of the kind described comprising a movably mounted support for supporting and moving a strip of flooring, a series of burnishers disposed above said support, a pivotally mounted varnish tray arranged to apply a coating of varnish to the upper surface of said strip in its passage through said machine and a series of brushes arranged in the path of travel of said strip for spreading the varnish applied by said tray.

15. An apparatus of the kind described comprising a movably mounted support for moving and supporting a strip of flooring, a series of glass burnishers disposed above said support, means for holding said burnishers in contact with the strip of flooring under pressure, a pivoted varnish tray arranged in the path of travel of said strip of flooring having an opening for applying varnish to the upper surface of said strip, means for supplying varnish to said tray and a series of brushes arranged in the path of travel of said strip for spreading and smoothing the varnish supplied.

16. An apparatus of the kind described comprising a frame having a horizontally disposed guideway, a movable conveyer working in said guideway for supporting the strip of flooring, a series of yielding burnishers disposed above said movable support for smoothing the strip of flooring in its passage therethrough, means for applying a coating to the upper surface of said strip in its passage through said machine, and means for spreading said varnish.

In testimony whereof I hereunto affix my signature in the presence of two witnesses.

ELMER C. DITTMAR.

Witnesses:
 ELIZABETH V. LOWE,
 OLIVER J. DECKER.